Figure 1:
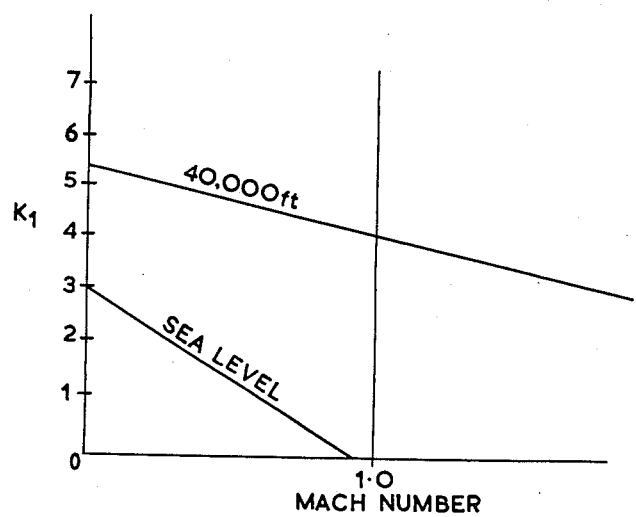

July 17, 1962    A. G. BARNES ET AL    3,044,735
AIRCRAFT MANOEUVRE BOOST CONTROL SYSTEMS
Filed Nov. 16, 1959    3 Sheets-Sheet 1

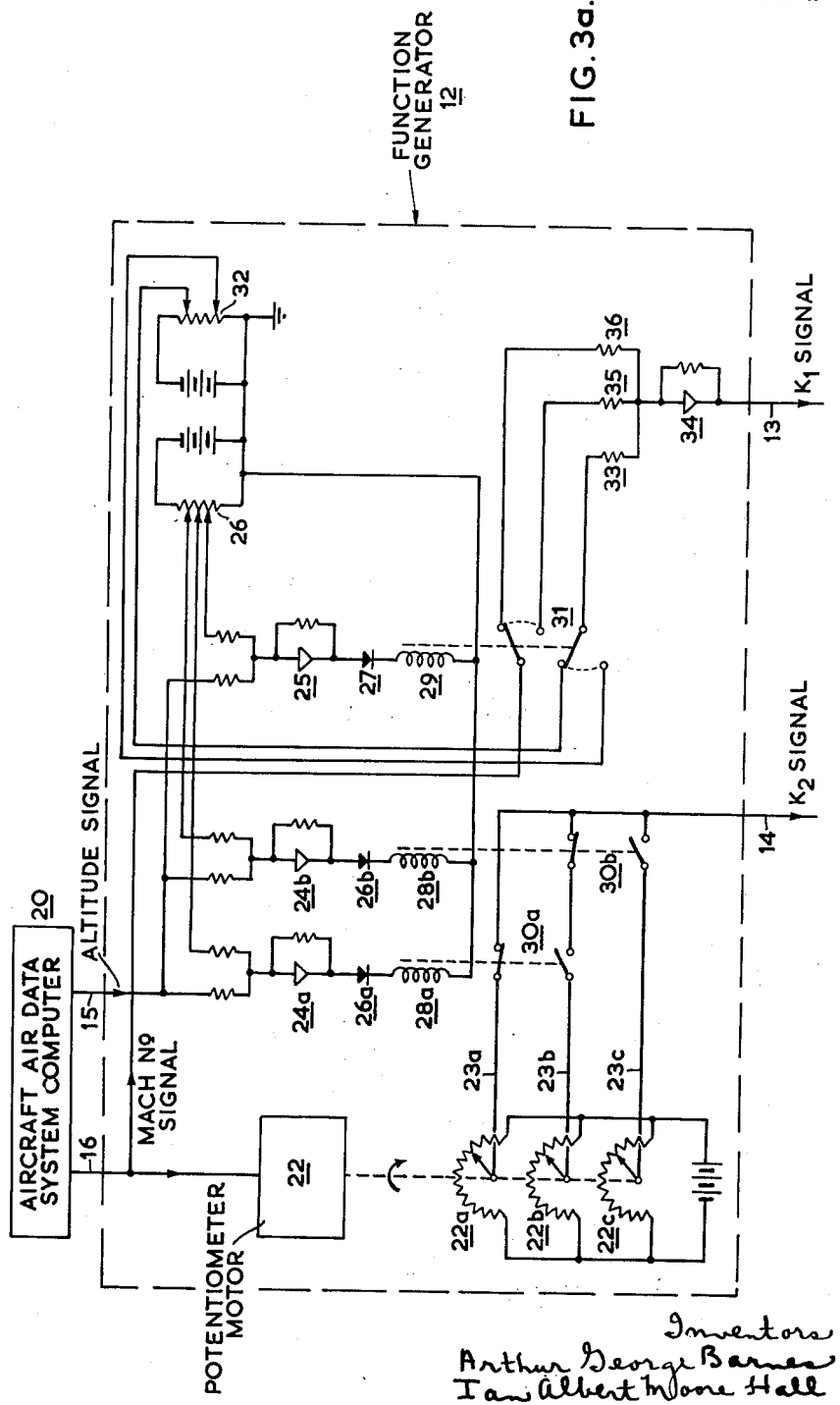

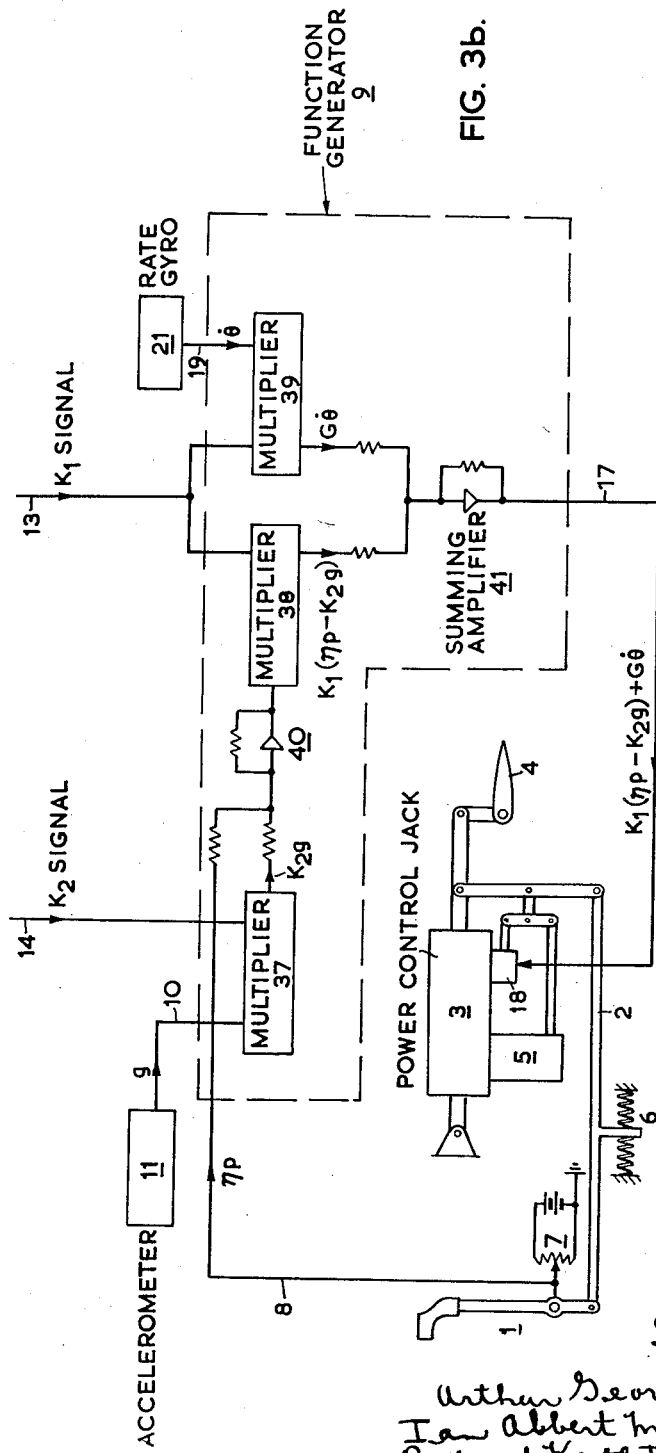

United States Patent Office 3,044,735
Patented July 17, 1962

3,044,735
AIRCRAFT MANOEUVRE BOOST CONTROL SYSTEMS
Arthur George Barnes, Wigan, and Ian Albert Moore Hall, Lytham St. Annes, England, and Richard Keith Thomasson, Thurso, Caithness, Scotland, assignors to The English Electric Company Limited, London, England, a British company
Filed Nov. 16, 1959, Ser. No. 853,321
Claims priority, application Great Britain Nov. 28, 1958
5 Claims. (Cl. 244—83)

This invention relates to manoeuvre boost control systems for improving the longitudinal handling characteristics of high speed aircraft.

Implicit in the design of a long range, high speed aircraft are small frontal area, thin wings, and large fuel capacity. To satisfy these requirements a very long, thin fuselage containing crew, load fuel and equipment is almost inevitable. Associated with such a fuselage will be a considerable inertia in pitch which can cause the aircraft to have sluggish longitudinal characteristics. Such characteristics are most undesirable, especially if the aircraft has to be flown very precisely; for example when used as a weapon platform.

The system according to the invention is intended to improve the initial pitch response of an aircraft and yet leave the steady state relationship between tailplane angle and associated manoeuvre unchanged. If desired the system may be designed to be complementary to the normal control circuit, so that it may be selected "in" or "out" and failure of it will not jeopardise the safety of the aircraft. In use, the only manifestation of the system to the pilot will be improved pitch handling characteristics, with unchanged stick force per "$g$." The significance of the expression "$g$" as used in this specification is acceleration in the pitching plane occurring in response to the pitch control or to vertical gusts.

According to this invention, an aircraft manoeuvre boost control system for improving the rate of response in pitch of the aircraft to movement of the pilot's control comprises, in combination with tailplane control means including a pilot's control stick, a tailplane power actuator, and a mechanical linkage connecting the control stick and the actuator, an accelerometer positioned in the aircraft to measure acceleration of the aircraft in pitch and to provide an acceleration-responsive electrical signal, electrical transducer means connected to said tailplane control means and operative to provide a signal which is a measure of the displacement of the pilot's control stick, electrical computer means connected to respond to the acceleration-responsive signal and to said signal which is a measure of the stick displacement and operative to produce a boost signal which increases with increase of said stick displacement signal and decreases with increase of the acceleration-responsive signal, and a connection between said electrical computer means and said power actuator to supply the boost signal to the actuator to supplement the pilot control transmitted along said mechanical control linkage.

Figure 2:
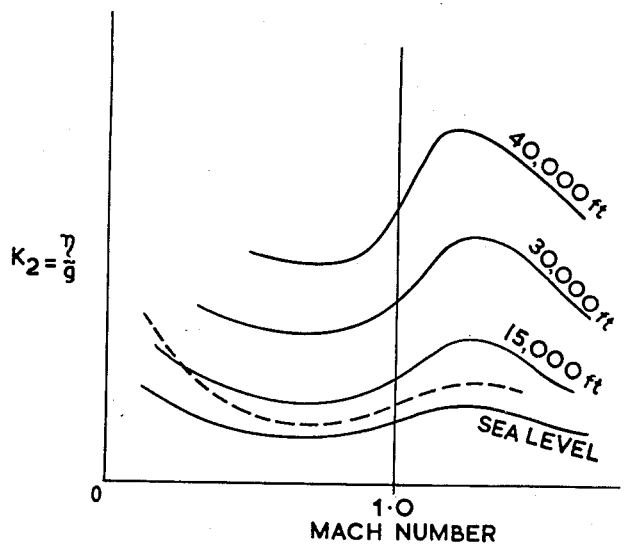

The invention will now be described with reference to the accompanying drawings in which:

FIGS. 1 and 2 show characteristics applicable to the pitch response of an aircraft, and FIG. 3 (of which FIGS. 3a and 3b form part) show schematically an aircraft manoeuvre boost control system embodying the invention.

By the preferred feature of the invention, the applied tailplane angle (to be denoted $\eta$) is given by:

$$\eta = \eta_P + \eta_B$$

where $$\eta_B = K_1(\eta_P - K_2 g)$$

Here $\eta_P$ is the tailplane angle applied by the pilot's control stick in the absence of a boost control,
$\eta_B$ is the additional tailplane angle applied by the boost control,
$K_1$ is the gain of the boost control system, and
$K_2$ is the value of $\eta/g$ under steady state conditions.

Other features of the invention relate to the manner in which the parameters $K_1$ and $K_2$ are controlled in accordance with the flight conditions of the aircraft. It is found, for example, that a value of $K_1$ suited to the pilot's feel of control of a typical high speed aircraft is about 3 when the aircraft is flying at a fairly low speed. At higher speeds the aircraft becomes naturally more responsive to the pilot's control and the gain of the manoeuvre boost control provided by this invention can be reduced with advantage. It is in accordance with one preferred feature of this invention for the manoeuvre boost control system to include means for reducing $K_1$ with increasing speed and further, where required, to render this dependence of $K_1$ upon speed also dependent upon the altitude of the aircraft to offset the weakening of the natural response of the aircraft in more rarified atmospheres.

This is illustrated in FIG. 1 where typical values of $K_1$ suitable for use in a pitch handling manoeuvre boost control system are shown as a function of Mach number at two different altitudes.

The full line curves of FIG. 2 show relationships between the steady state value of the quantity $\eta/g$ and Mach number for different altitudes in a typical high speed aircraft. $K_2$ is therefore a controlled quantity varied in accordance with relationships such as those in this figure. In practice it is found that the relationships depend upon the position of the centre of gravity of the aircraft. For example, if the centre of gravity is well forward in the aircraft the relationship applicable at sea level is displaced to the position indicated by the broken line curve. It is desirable for the value of $\eta_B$ to be zero under steady state flight conditions and it is difficult to render $K_2$ dependent upon the actual position of the centre of gravity. Accordingly, it is preferred to utilize a value of $K_2$ which follows a compromise relationship lying midway between the relationships applicable to two estimated limits of the centre of gravity position. This means that if the centre of gravity is at a position corresponding to this midway relationship $\eta_B$ is zero under steady state conditions. However, if the centre of gravity is forward of this position a small amount of boost will be provided in the steady state. The effect of this will be to provide a slightly more sensitive response to the pilot control because the pilot's control stick force for a given manoeuvre increases as the centre of gravity moves forward and the effect of the boost will be to reduce this increase and thereby render the feel of the control more consistent even though the centre of gravity may vary with different load and fuel distribution.

Referring to FIG. 3, a pilot's control stick 1 is connected through a linkage 2 to the power control jack 3. This linkage is also connected to an artificial feel system 6, diagrammatically illustrated by coiled springs. Movement of the control stick 1 will actuate the power control valve 5 and cause the jack to operate the aerodynamic surface 4.

An electrical pick-up member formed by the potentiometer 7 is connected to the stick 1 and feeds through a conductor 8 a signal proportional to the $\eta_P$ quantity into a function generator 9. A signal denoted $g$ is fed into the function generator 9 through a conductor 10 from an accelerometer 11. A signal denoted $\theta$ is also fed into the function generator 9 through a conductor 19 from a rate gyro 21. The symbols $g$ and $\eta_P$ have the meanings assigned to them above, and the symbol $\theta$ represents the first derivative of the pitch angle with respect to time.

Height and Mach number parameters are fed from the aircraft air data system 20 through conductors 15 and 16 respectively and into another function generator 12, from where signals proportional to factors denoted $K_1$ and $K_2$ are fed through conductors 13 and 14 into the first mentioned function generator 9.

The output signal of the function generator 9 is $\eta_B + G\theta$ and is fed through conductor 17 into the autostabiliser actuator 18, the symbol G representing the gain of the autostabiliser system.

The duty of the function generator 12 is to compute two quantities denoted $K_1$ and $K_2$ and provide signals proportional to these quantities from input signals representing Mach number and altitude. Each of the quantities $K_1$ and $K_2$ may be a different function of Mach number according to the range of altitude in which the altitude signal lies. The duty of the function generator 9 is to compute the signal to be fed to the actuator 18 from the output signals proportional to $K_1$ and $K_2$ and from the $g$ and $\theta$ signals supplied by the accelerometer and the rate gyro and also from the $\eta_P$ signal. To generate $\eta_B$ two multipliers 37 and 38 and one summing amplifier 40 are involved. A third multiplier 39 provides $G\theta$ and this is added to $\eta_B$ in summing amplifier 41.

A possible circuit for a function generator 12 is shown to comprise a servo motor 22 which sets the sliders of three different potentiometers 22a, 22b and 22c to provide three signals which are different functions of the signal operating the potentiometer servo motor 22. The motor 22 is driven by the Mach number signal supplied along the conductor 16 and accordingly the three outputs from the potentiometer system supplied along lines 23a, 23b and 23c as shown will be different functions of the Mach number according to the predesigned characteristics of the three potentiometers 22a, 22b and 22c.

The signal proportional to the altitude of the aircraft is fed into three summing amplifier units 24a, 24b and 25 respectively. Bias signals are also supplied from a potentiometer system 26 to each of these amplifier systems. The summing amplifiers have a conventional form, the input signals being fed through summing resistors to provide a common input to the amplifier unit proper. In the drawings the amplifier units are denoted by the triangular symbols and the parallel connected resistors denote a feed back. The outputs from each of these summing amplifiers are rectified by the rectifiers 26a, 26b and 27 respectively and fed through the operating coils 28a, 28b and 29 of the coil operated switch systems 30a, 30b and 31 respectively.

In operation, the reference signals supplied from the potentiometer system 26 cause the settings of the switch systems to be determined by the magnitude of the altitude signal supplied by the air data system 20. Thus, the positions of the contacts of the switch systems 30a and 30b which are connected to the lines 23a, 23b, 23c as shown, correspond to an initial setting of the system applicable at a low altitude. When the altitude signal exceeds the magnitude determined by the bias setting applicable to summing amplifier 24a, this bias setting being lower than the corresponding setting of amplifier 24b, the switch system 30a operates to close the contact on 23b and open on 23a, thus connecting line 23b to the output line 14. Under these conditions the output signal along this line 14 is a function of the Mach number signal determined by the characteristics of the potentiometer 22b. When the altitude signal increases further to exceed the presetting bias level applicable to amplifier unit 24b the contact systems 30b operates to open the contact system in the line 23b and simultaneously close its contact system in the line 23c. The output signal along line 14 is then a function of the Mach number signal as determined by a potentiometer 22c, to provide the $K_2$ signal.

The $K_1$ signal may be one of two alternative functions governed by the altitude. The amplifier 25 produces an output signal which alters the setting of the switch system 31 when the altitude exceeds a predetermined level. Thus, in operation, at low altitude where the contacts of the system 31 are in the position shown, a selected reference signal is derived from the potentiometer system 32 and passed through an input resistor 33 of a summing amplifier 34 whereas the Mach number signal is supplied through a resistor 36 to the summing amplifier 34. In the alternative setting of the switch system 31 a different reference signal is supplied from the potentiometer system 32 and fed through the same input resistor 33 of the amplifier 34 and the Mach number signal is fed through a resistor 35 instead of the resistor 36. In this way the output signal representing $K_1$ and supplied by the amplifier 34 is a signal which decreases with increasing Mach number at a rate governed by the magnitude of the appropriate resistor 35 or 36 and having an initial value determined by the reference setting of the potentiometer system 32.

The function generator 9 comprises three multiplier units 37, 38 and 39 and two summing amplifiers 40 and 41. The multiplier units 37, 38 and 39 may be of any conventional form suited to the multiplication of analogue quantities and are operative to produce signals proportional to the products $K_2$ and $g$, $K_1$ and $(\eta_P - K_2 g)$ and $G\theta$, where G is directly proportional to $K_1$. To generate $\eta_B$, the product of $K_2$ and $g$ from the multiplier 37 is subtracted from $\eta_P$ on line 8 by summing amplifier 40. To generate $G\theta$, a proportion of the signal $K_1$ is multiplied by $\theta$ on line 19 by the multiplier 39. These two signals are then added together by summing amplifier 41 which provides the output signal along conductor 17.

The description of function generator 12 relates to one possible form it could take. Ideally, $K_2 = \eta/g$ should vary continuously with height and Mach number, and alternative function generators could be devised to do this.

What we claim as our invention and desire to secure by Letters Patent is:

1. An aircraft manoeuvre boost control system for improving the rate of response in pitch of the aircraft to movement of the pilot's control comprising, in combination with tailplane control means including a pilot's control stick, a tailplane power actuator, and a mechanical linkage connecting the control stick and the actuator, an accelerometer positioned in the aircraft to measure acceleration of the aircraft in pitch and to provide an acceleration-responsive electrical signal, electrical transducer means connected to said tailplane control means and operative to provide a signal which is a measure of the displacement of the pilot's control stick, electrical computer means connected to respond to the acceleration-responsive signal and to said signal which is a measure of the stick displacement and operative to produce a boost signal which increases with increase of said stick displacement signal and decreases with increase of the acceleration-responsive signal, and a connection between said electrical computer means and said power actuator to supply the boost signal to the actuator to supplement the pilot control transmitted along said mechanical control linkage.

2. An aircraft manoeuvre boost control system as claimed in claim 1 wherein said electrical computer means comprises a summing amplifier connected to receive said acceleration-responsive electrical signal and said signal which is a measure of the stick displacement, the output from said summing amplifier being proportional to the difference between said signals and forming part of said boost signal.

3. An aircraft manoeuvre boost control system as claimed in claim 2 wherein said electrical computer means comprises means to generate a gain factor which decreases with increasing Mach number of the aircraft, and multiplier means connected to receive said gain factor and the output from said summing amplifier, the output from said multiplier means being proportional to the product of said gain factor and said first-mentioned output and forming part of said boost signal.

4. An aircraft manoeuvre boost control system as claimed in claim 3 comprising means to provide an input signal which decreases linearly with increasing Mach number, and wherein said electrical computer means further comprises an electrical selector system connected to receive said input signal and operated in accordance with the aircraft altitude, the output from said electrical selector system representing the gain factor and being connected to said multiplier means, whereby the linear relationship between the gain factor and aircraft Mach number is varied in accordance with the aircraft altitude.

5. An aircraft manoeuvre boost control system as claimed in claim 4 wherein said electrical computer means comprises a plurality of electrical signal function-generating devices and there is provided means responsive to the aircraft Mach number and connected to control said signal function-generating devices, a plurality of switch systems connected to the output of said signal function-generating devices, means responsive to the aircraft altitude for operating said switch systems, and multiplier means connected to receive the output of said switch systems and said acceleration-responsive signal, whereby said acceleration-responsive signal is modified in accordance with the aircraft Mach number and altitude.

References Cited in the file of this patent

UNITED STATES PATENTS

| | | |
|---|---|---|
| 2,823,879 | Smith et al. | Feb. 18, 1958 |
| 2,852,212 | Mallery et al. | Sept. 16, 1958 |
| 2,859,926 | Westbury | Nov. 11, 1958 |
| 2,873,074 | Harris et al. | Feb. 10, 1959 |